United States Patent [19]
Patterson

[11] 3,890,963
[45] June 24, 1975

[54] KINESTHERAPY DEVICE
[76] Inventor: John W. Patterson, 1528 1/2 Beverly Dr., Los Angeles, Calif. 90035
[22] Filed: Feb. 1, 1974
[21] Appl. No.: 438,674

[52] U.S. Cl. .................... 128/24.1; 128/33; 128/36
[51] Int. Cl. ............................................. A61h 29/00
[58] Field of Search ................. 128/24.2, 33, 38–40, 128/36, 24.1

[56] References Cited
UNITED STATES PATENTS
| | | | |
|---|---|---|---|
| 2,951,479 | 9/1960 | Sellner | 128/33 |
| 2,976,866 | 3/1961 | Kalish | 128/33 |
| 3,457,911 | 7/1969 | Carpenter | 128/38 X |

Primary Examiner—Lawrence W. Trapp
Attorney, Agent, or Firm—Sellers and Brace

[57] ABSTRACT

A kinestherapy device having a hollow body shaped to engage the back or buttocks and having a motor driven fan and unbalanced means effective to vibrate said device and an area of the human body resting thereagainst. The device can be used in an auto vehicle and powered by a service cord insertable into the socket of the vehicle cigarette lighter. A large diameter fan is effective to distribute a multiplicity of air jets over a wide area of the body while that area is being manipulated and vibrated by the powered vibrator means housed within the hollow body.

7 Claims, 3 Drawing Figures

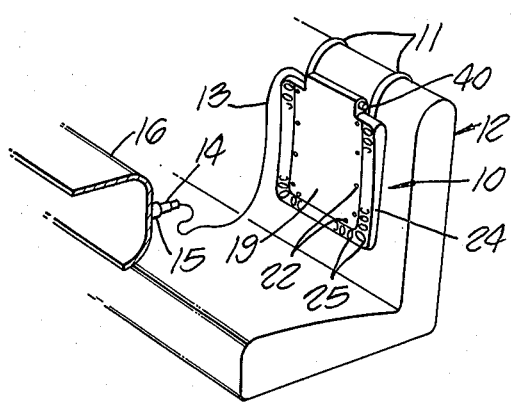
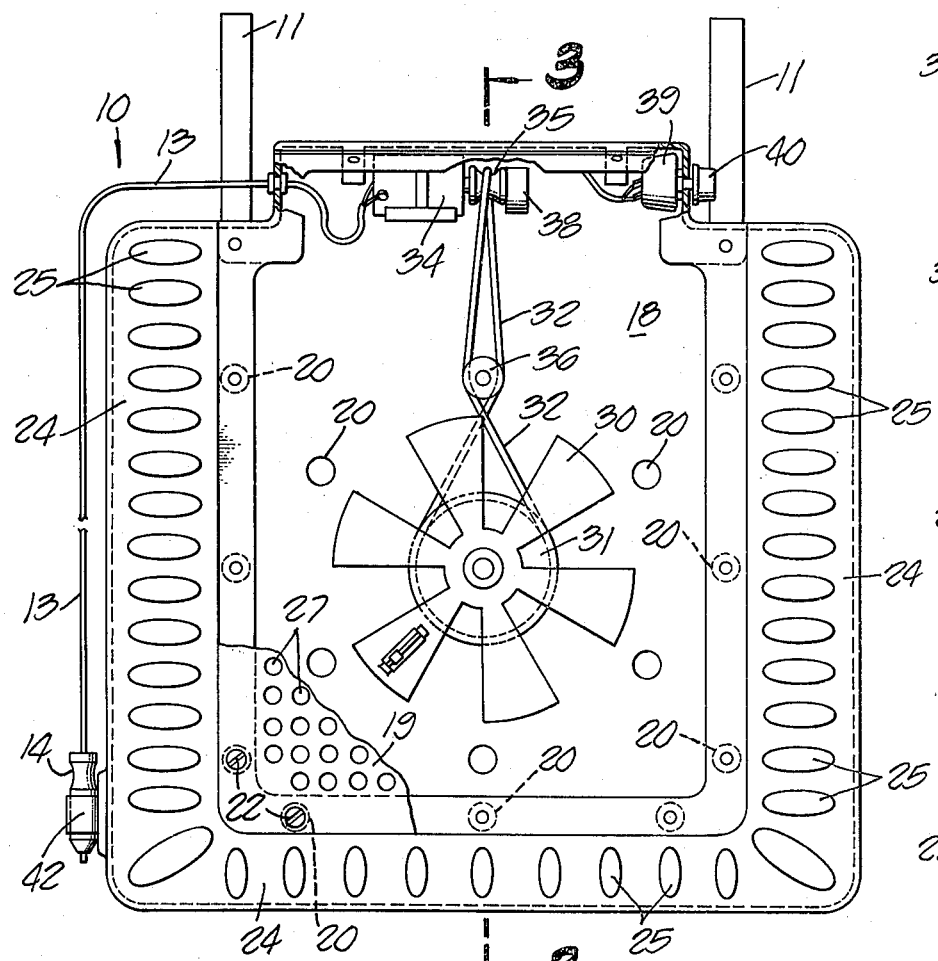
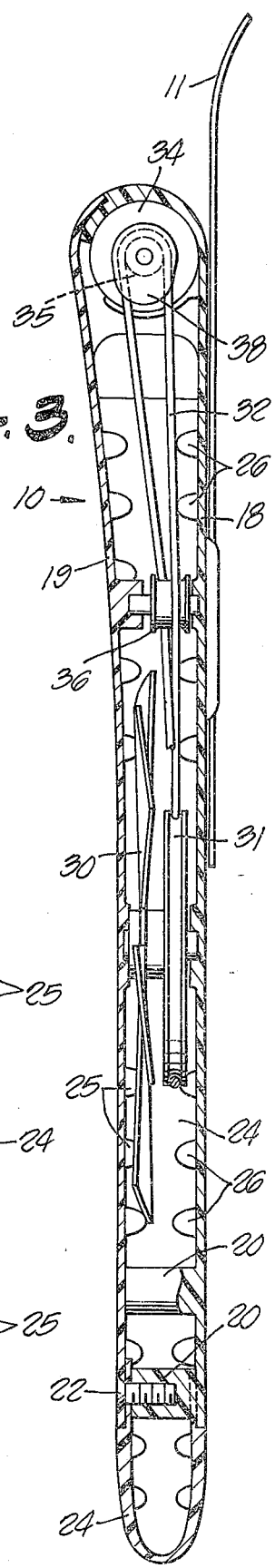

KINESTHERAPY DEVICE

This invention relates to kinestherapy devices and more particularly to an improved, rugged, lightweight, cushion-like device adapted to support the back or the buttocks and powered by motor means having a service cord connectable to a vehicle cigarette lighter socket or other power source.

Persons working for long periods in the same position or while riding as a passenger of a motor vehicle have need for relaxing treatments of a type conveniently and simply provided by the present invention. For this there is provided a kinestherapy device having a hollow main body formed essentially of molded high-strength, lightweight, plastic material and enclosing an unbalanced power driven means for vibrating the device and jetting air through a multiplicity of ports against a person in contact therewith. The vibrations generated by the device manipulate and vibrate portions of the body and stimulate the blood circulation, soothe and relax the muscles and body tissues in a beneficial manner. The only moving parts comprise the motor rotor, the fan blade and the connecting belt between the motor and fan. Flexible and resilient support loops attachable to the rear of the device serve to support it at a convenient height on the edge or back of a seat.

Accordingly, it is a primary object of this invention to provide an improved, lightweight, rugged, power driven kinestherapy device.

Another object of the invention is the provision of a lightweight, kinestherapy device formed essentially of molded high-strength plastic material and enclosing an air circulating fan powered by a vibrating motor connectable to any suitable source of electrical energy.

Another object of the invention is the provision of a kinestherapy device adapted to be supported on the bottom or back of a vehicle seat and having a motor driven air circulating fan and vibratory device adapted to be connected to a vehicle electrical supply via the socket of a cigarette lighter.

These and other more specific objects will appear upon reading the following specification and claims and upon considering in connection therewith the attached drawing to which they relate.

Referring now to the drawing in which a preferred embodiment of the invention is illustrated:

FIG. 1 is a somewhat diagrammatic perspective view showing an illustrative embodiment of the invention kinestherapy device supported against the back of a vehicle seat with its service cord connected to the vehicle cigarette lighter;

FIG. 2 is a top view of the device on an enlarged scale with portions of the cover plate broken away to show internal constructional details; and FIG. 3 is a cross-sectional view generally along line 3—3 on FIG. 2 on a larger scale.

Referring initially to FIG. 1, there is shown an illustrative embodiment of the kinestherapy device, designated generally 10, suspended against the backrest of a passenger vehicle. For this purpose, device 10 is provided with a pair of resilient loops 11, 11 secured to the base of the device and engaged over the upper edge of the vehicle seat 12. A flexible service cord 13 extends from the device and includes a plug 14 designed to be inserted in the socket 15 of a vehicle cigarette lighter in lieu of the lighter itself, the lighter socket 15 being mounted in the vehicle dash 16.

Referring now to FIGS. 2 and 3, it will be understood that device 10 comprises a generally rectangular hollow main body including a base plate 18 and a cover plate 19 lying generally in spaced apart parallel planes. One of these plates, as plate 18, is provided with integral spacers 20 at closely spaced intervals and to which cover plate 19 is secured by screws 22. The space between the peripheral edges of base and cover plates 18, 19 is preferably enclosed by a soft, pliant plastic sidewall member 24 of U-shape in cross-section. This sidewall closure member is here shown as molded in one piece, the edges of its legs being shaped to overlap the peripheral edges of base plate 18 and cover plate 19 with one of these edges provided with holes to receive the fastener screws 22. It will therefore be understood that these screws serve to hold the sidewall member 24 and the cover member 19 assembled to the bosses 20 of base plate 18.

Member 24 is provided with a multiplicity of air openings 25. Likewise, base plate 18 is formed with a multiplicity of air openings 26 and cover plate 19 has even a larger number of smaller air openings 27.

Suitably journalled between base plate 18 and cover plate 19 is a large diameter air circulating fan 30 having a pulley 31 supporting a belt 32. Suitably secured within one interior edge portion of device 10 is an electric motor 34 having a pulley 35 driving fan belt 32. If one of the separator bosses 20 interferes with the runs of belt 32 these runs may operate over an idler pulley 36 journalled on or near the interfering boss.

It will be understood that the shaft of motor 34 is provided with an unbalanced weight 38, here shown as secured to the outer end of pulley 35. This weight may be mounted on an adjustable eccentric to permit adjusting the magnitude of the unbalance forces generated by the motor.

The service connections to the motor include an adjustable rheostat 39 having a control knob 40 conveniently accessible from the exterior side of the main housing. When the service cord is not connected to the cigarette lighter, it may be held captive within a spring clip 42 secured to one edge of the main body.

The operation of the kinestherapy device 10 will be readily apparent from the foregoing detailed description. It may be placed either against the back or the bottom of the seat 12. In the latter case, the suspension hooks 11 may be detached or engaged about the front edge of seat 12. Plug 14 of the service cord is connected into the cigarette lighter socket 15 and control knob 40 of the rheostat is adjusted to operate the motor at a desired speed to provide the degree of air circulation and amplitude of vibratory motion desired. The fan 30 serves to discharge jets of air through the widely distributed openings 25, 27 as the main body of the device is vibrated by the unbalanced weight 38. It will be appreciated that the device may be shifted to contact different areas of the body to relieve stress, tension and to provide the beneficial effects found most advantageous. When not in use, plug 14 is detached and stored in spring clip 42.

While the particular kinestherapy device herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A kinestherapy device having a relatively thin hollow main body adapted to be placed against the back or beneath the buttocks, said main body having wide area base and cover plates interconnected by a flexible peripheral member and provided with a multiplicity of widely distributed air inlet and outlet openings, a motor driven air circulating means mounted within said main body operable to circulate air through said widely distributed openings and against a person resting against said cover plate, said motor driven means including means powered by said motor for vibrating said main body, service cord means extending between said motor and a source of electrical energy, and manually operable speed control means in circuit with said motor and said service cord means.

2. A device of the type defined in claim 1 characterized in that the base and cover plates of said main body are formed essentially of high strength molded plastic material.

3. A device of the type defined in claim 1 characterized in that said main body is a one-piece molded plastic base plate, a cover plate overying said base plate and held assembled thereto by a plurality of intervening spacers and cooperating fasteners, peripheral edge portions of said base and cover plates being interconnected by said flexible peripheral member formed with a multiplicity of air flow openings.

4. A device as defined in claim 3 characterized in that air circulating means comprises rotor fan means supported on an axis between and generally normal to said base and cover plates.

5. A device as defined in claim 3 characterized in that said flexible peripheral member is generally U-shaped in cross-section and extends along three peripheral edges of said base and cover plates.

6. A device as defined in claim 5 characterized in the provision of hanger means secured to said main body and engageable over the edge of an auto seat to support said device to contact a part of the body of a person seated on said seat.

7. A device as defined in claim 6 characterized in the provision of a service cord for said motor having a service plug insertable into the socket of a conventional auto cigarette lighter.

* * * * *